United States Patent
Griepentrog

(10) Patent No.: US 6,285,143 B1
(45) Date of Patent: Sep. 4, 2001

(54) VIDEO DISPLAY PROTECTION CIRCUIT

(75) Inventor: Dal Frank Griepentrog, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/218,520

(22) Filed: Dec. 22, 1998

Related U.S. Application Data

(60) Provisional application No. 60/093,700, filed on Jul. 22, 1998.

(51) Int. Cl.$^7$ .................................................... G09G 1/04
(52) U.S. Cl. ........................................... 315/381; 315/386
(58) Field of Search .................................... 315/381, 384, 315/386; 348/173

(56) References Cited

U.S. PATENT DOCUMENTS

| | | | |
|---|---|---|---|
| 4,390,817 | 6/1983 | Johnson | 315/384 |
| 5,043,639 | 8/1991 | Gurley et al. | 315/386 |
| 5,089,754 | 2/1992 | George | 315/386 |

OTHER PUBLICATIONS

European Search Report Oct., 1999.

*Primary Examiner*—Seungsook Ham
*Assistant Examiner*—Shun Lee

(74) *Attorney, Agent, or Firm*—Joseph S. Tripoli; Paul P. Kiel

(57) ABSTRACT

A grid kick circuit for applying beam cut-off bias to the grid of a kinescope to provide spot burn protection. The circuit includes a first switching circuit having an output coupled to a first electrode of a grid kick capacitor and a second switching circuit having an output coupled to a second electrode of the capacitor and the grid. When beam blanking is not desired, charging current is supplied to the capacitor through a first current path from a first voltage source while the second switching circuit regulates the voltage at a second electrode of the capacitor and the grid. Current for the second switching circuit is provided by a second current path which is coupled to the first voltage source and is independent of the first path. When beam cut-off is desired, the first switching circuit clamps the first electrode of the capacitor to ground, the second switching circuit decouples the second electrode of the capacitor from the second voltage source, and the cut-off voltage developed across the capacitor is applied to the grid of the kinescope. Advantageously, the first and second current paths provide improved capacitor charging efficiency, the active pull down of the capacitor voltage provides increased cut-off speed and the grid bias voltage is regulated during normal operation when cut-off is not desired.

7 Claims, 2 Drawing Sheets

VIDEO DISPLAY PROTECTION CIRCUIT

This application claims the benefit of U.S. Provisional Application Ser. No. 60/093,700, filed Jul. 22, 1998.

FIELD OF THE INVENTION

This invention relates to video display systems, such as television receivers and computer and other monitors, and particularly to protection circuitry for providing phosphor burn protection for kinescopes used in such display systems by application of a beam cut-off bias to a control grid of the kinescope when protection is desired.

BACKGROUND OF THE INVENTION

Direct-view and projection display systems conventionally employ kinescopes as display devices. During normal operation of a kinescope, scanning circuitry deflects and electron beam to produce a relatively large area raster on the face plate of the kinescope and video modulation of the beam produces a visible picture by activating phosphors deposited on the face plate. The beam energy in normal operation is distributed over the whole area of the kinescope face plate. If scan loss should occur, the beam energy may be concentrated on a relatively small area of the face plate and this high concentration of beam energy may produce permanent damage to the phosphor, a so-called "spot burn". Scan loss may occur when the display device is turned on under "hot start" conditions (i.e., when the receiver is rapidly cycled between on and off modes) or it may occur, for example, when a component failure occurs.

Occurrence of scan loss conditions is also a concern when a kinescope is turned off. When the power supply to a kinescope is removed, the cathode continues to emit electrons until it has sufficiently cooled off. As a result, the cathode continues to emit a decaying electron beam for a definite period of time after the deflection voltages have been cut off. In order to prevent spot burns on the face plate during this period, it is desirable to maintain a sufficient bias voltage between the cathode and the control grid to prevent the decaying electron beam from illuminating the face plate without deflection voltages.

During normal operation, a voltage difference is maintained between the cathode and the control grid. A large voltage difference results in low illumination levels on the display screen and a low voltage difference results in high illumination levels. For example, a typical cathode voltage may be about 180 volts and a typical grid voltage may be in a range of about ten to twenty volts or so, and the cathode voltage is modulated to reduce the voltage difference to change the luminance level. When the display is turned off, the cathode and grid voltage difference goes toward zero, and if deflection voltages are not present, the zero cathode bias causes the electron beam to be concentrated on a very small area of the display screen.

One method of preventing spot burn during kinescope turn-off is the so-called "grid kick" method. In such a method, a charge storage device is coupled to a control grid of the cathode ray tube and further coupled through a switch device to a voltage supply. The charge storage device is charged through the switch device by the voltage supply when a control signal coupled to a control input of the switch device indicates that a deflection signal is present. The switch device decouples the supply voltage from the charge storage device when the control signal indicates that the deflection signal is not present and places a negative blanking voltage on the control grid. In this manner, a sufficient voltage difference is maintained between the cathode and the control grid when the cathode voltage collapses, and thus the display screen remains blanked. Such a method is described, for example, in U.S. Pat. No. 5,089,754 entitled "Protection Circuit for a Cathode Ray Tube" which issued Feb. 18, 1992 to John B. George. Another example of a "grid kick" type of kinescope protection circuit is described by Gurley et al. in U.S. Pat. No. 5,043,639 entitled "Video Display Apparatus With Kinescope Spot Burn Protection Circuit" which issued Aug. 27, 1991. The Gurley et al. circuit is similar to that of George but utilizes a passive charging source and a switching device coupled between a plate of the capacitor and ground.

Although the above-described grid kick circuits employ only a single switching device, they utilize relatively complex additional bias circuitry as compared, for example, to arrangements employing multiple switching devices as, for example, the grid kick circuitry employed in the model CTC-195 Color Television Receiver manufactured by Thomson Consumer Electronics, Inc. FIG. 1 herein is a schematic diagram of such a grid kick circuit in a television receiver.

Advantageously, the use of a pair of switching devices in the grid kick circuit of the CTC-195 receiver provides active pull-down of the grid kick capacitor giving a rapid reduction in grid voltage and additionally provides an actively regulated DC bias voltage for the grid during normal operation of the receiver.

The advantageous features of the CTC-195 grid kick circuit of active pull down of the kick capacitor when beam blanking is required and active regulation of the grid bias when blanking is not required might lead one to believe that no further improvement in the circuitry would be necessary.

However, in accordance with an aspect of the present invention, it has been found that under certain grid kick circuit applications, it would be desirable to further improve the performance of the grid kick circuit. Specifically, it has been found that in applications where the supply voltage to the grid kick circuit is relatively low, that a need exists for improving the charging efficiency of the grid kick circuitry. As discussed in detail later with regard to the prior art FIG. 1 circuit, the charging efficiency of the prior art circuit is only about 60% expressed in terms of the voltage stored on the capacitor as a percentage of the value of the high voltage supply. While this charging efficiency is perfectly adequate where supply voltages in the order of 250 volts is available, it may result in marginal beam cut-off performance in applications where the high voltage supply is appreciably less than 250 volts.

It is, therefore, desirable to provide a grid kick circuit having improved charging efficiency for the kick capacitor.

SUMMARY OF THE INVENTION

Apparatus, embodying the invention, for applying beam cut-off bias to the grid of a kinescope for spot burn protection, comprises a capacitor having first and second electrodes and source for providing a beam cut-off control signal. A first switching circuit is provided responsive to a first condition of the control signal when beam cut-off is not desired for applying a charging current to the first electrode of the capacitor from a first voltage source, and responsive to a second condition of the control signal when beam cut-off is desired for coupling the first electrode of the capacitor to a source of reference potential. A second switching circuit is provided having an output coupled to the second electrode of the capacitor and to the grid of the kinescope, the second switching circuit being responsive when enabled for coupling a second voltage source to the output and being responsive when disabled for isolating the output from the second voltage source. Circuit means are provided for enabling the second switching circuit from a source of current that is independent of the charging current when beam cut-off is not desired and for disabling the second switching circuit otherwise.

In an illustrative application of the principles of the invention, the circuit means comprises a linear circuit path for supplying an operating current to an input of the second switching circuit directly from the first voltage source when beam cut-off is not desired; and non-linear circuit path for diverting the operating current from the linear circuit path to the first switching circuit when beam cut-off is desired.

BRIEF DESCRIPTION OF THE DRAWING

The foregoing and further features of the invention are illustrated in the accompanying drawing, wherein like elements are denoted by like reference designators, and in which.

DETAILED DESCRIPTION

Figure 1:
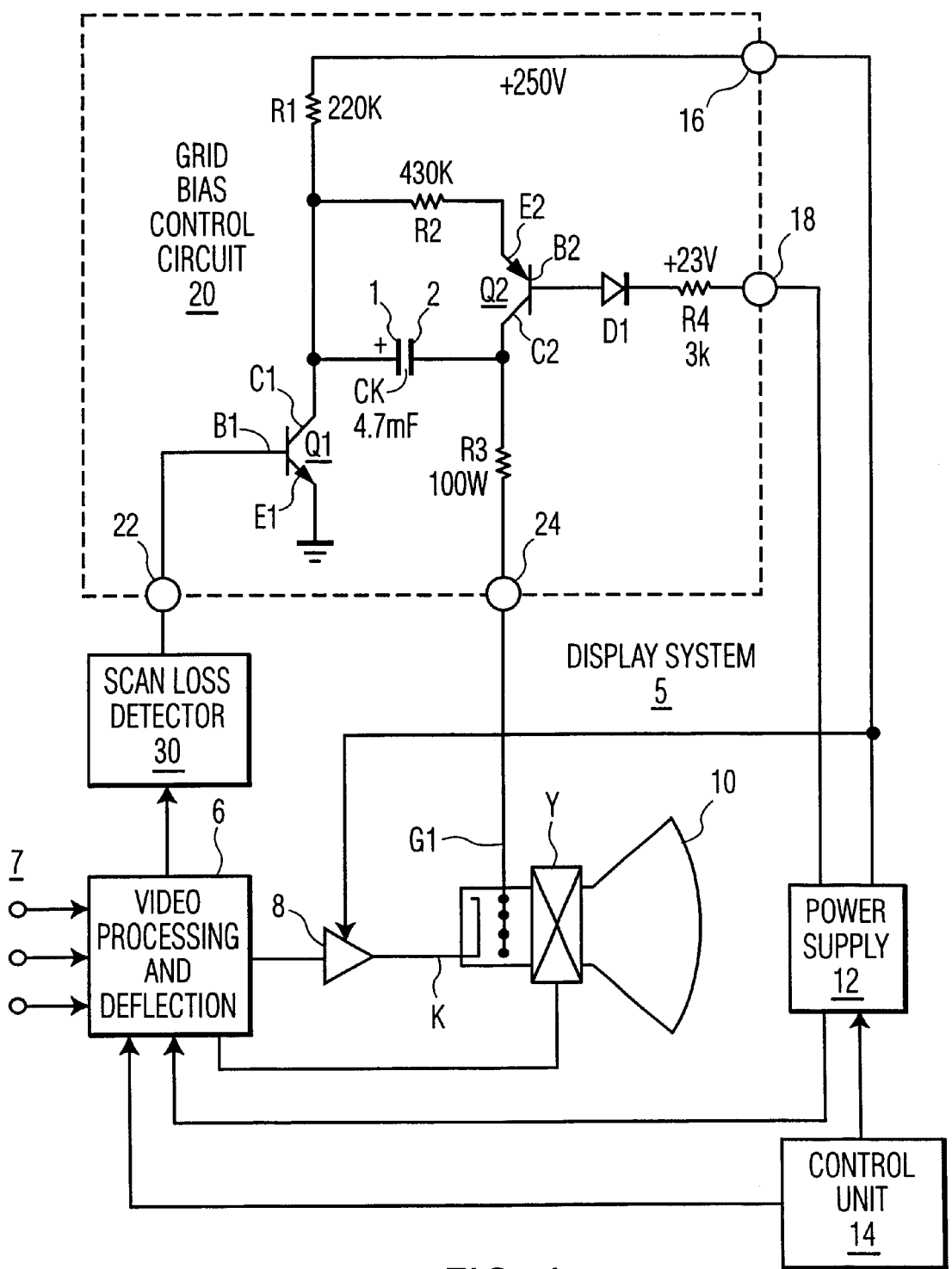
FIG. 1 is a circuit diagram, partially in block form, of a television apparatus having a grid bias control circuit according to the prior art.

A display system 5 of FIG. 1 comprises a video processing and deflection unit 6 of conventional design having a plurality of input terminals 7 for receiving input signals to be displayed and having an output coupled via a kinescope driver amplifier 8 to a cathode K of a kinescope 10. Unit 6 also supplies deflection signals to a yoke Y of the kinescope 10. Power for processing and deflection unit 6 and for driver amplifier 8 is provided by a power supply 12. Control of the power supply 12 is provided by a control unit 14 which also supplies control signals to unit 6, for example, for controlling functions such as channel selection, signal source selection, and the like in a television receiver. Supply 12 also provides a +250 volts to a first supply terminal 16 of a grid bias control circuit 20 which is a "grid kick" type of beam blanking circuit (outlined in phantom). Circuit 20 has a second supply input terminal 18 which is coupled to receive a grid bias voltage supply of +23 volts from power supply 12. A scan loss detector 30 is coupled to an output of video processing and deflection unit 6 for providing an output signal to input 22 of the grid bias control circuit 20 indicative of the occurrence of scan loss. Detector 30 may be of conventional design such as one that detects the presence or absence of horizontal pulses as is disclosed, for example, in the aforementioned patent of George. Another suitable scan loss detector would be one that monitors a supply voltage in the deflection processing portion of unit 6. For purposes of illustration, it will be assumed that detector 30 provides a current to terminal 22 when beam cut-off is desired (i.e., during a scan failure condition) and provides no current to terminal 22 when beam cut-off is not desired (i.e., during normal scanning conditions). An output 24 of the grid kick circuit 20 is coupled to the control grid G1 of the kinescope 10 for supplying thereto a regulated positive grid voltage of about +23 volts during normal operation of the receiver and supplying a grid cut-off voltage thereto when beam blanking is desired (i.e., under scan loss conditions).

For purposes of illustration and discussion, exemplary element circuit values are included in the schematic diagram of the grid bias control circuit 20. The circuit 20 comprises a common emitter amplifier Q1 having a base electrode B1 coupled to input 22 and a collector electrode C1 which is coupled via resistor R1 to +250 volt supply terminal 16. Collector C1 is also coupled to the emitter E2 of a common base amplifier Q2 and is coupled to the first electrode 1 of a grid kick capacitor CK. The second electrode 2 of capacitor CK is coupled to the collector C2 of the common base amplifier Q2 and, via a resistor R3, to the grid kick output terminal 24. Base bias for the common base amplifier Q2 is provided by a diode D1 and a series resistor R4 coupled in a sense to conduct base current from base electrode B2 to +23 volt supply terminal 18. Diode D1 provides protection against Vber breakdown (reverse base-emitter voltage breakdown).

In operation, when scanning is normal and grid cut-off bias is not desired, detector 30 supplies zero turn on current to the base B1 of common emitter connected amplifier transistor Q1, whereby Q1 is turned off and charging current flows from +250 supply terminal 16 through resistor R1 to the first electrode (1) of the grid kick capacitor CK and then through the collector-to-base junction of transistor Q2 to +23 volt supply terminal 16, causing a charge to develop in the capacitor. At the same time, a portion of the current flowing through resistor R1 also flows via resistor R2 to the input (emitter electrode E2) of transistor Q2 thus saturating transistor amplifier Q2. This saturated condition of Q2 clamps the second electrode of capacitor CK (and the grid G1) to a voltage of about 23 volts (neglecting the small saturation and diode D1 voltage drops). Transistor Q2 thus regulates the grid G1 at 23 volts as long as the scanning is normal.

When scan loss occurs, detector 30 sends a turn-on current to base B1 of transistor Q1 which clamps the first electrode 1 of grid kick capacitor CK to ground thus forcing the second electrode 2 of capacitor CK and the grid G1 to a negative potential proportional to the voltage to which CK was charged during normal operation. Concurrently, the connection of emitter E2 of Q2 to collector C1 of Q1 removes all emitter current from transistor Q2 thereby turning Q2 off. In this manner Q2 is controlled to be turned on when Q1 is off and vice versa.

As described thus far, it is seen that grid bias control circuit 20 of the prior art provides the advantageous of active pull down of capacitor CK voltage for fast beam cut-off when blanking is desired and regulation of control grid G1 voltage when blanking is not required. Consideration will now be given to a discussion of the problem, previously mentioned, regarding capacitor charging efficiency.

Recall from the above discussion that during normal operation, when beam blanking is not required, a portion of the current flow through resistor R1 goes to charge the grid kick capacitor CK and another portion of the current flow through resistor R1 goes to the emitter E2 of the common base amplifier transistor Q2 for maintaining transistor Q2 in saturation so as to regulate the grid voltage at +23 volts. Since some of the current of resistor R1 is thus diverted for controlling transistor Q2, capacitor CK will be charged to a potential less than the +250 volt supply at terminal 16.

Quantitatively, the charging efficiency for the illustrative element values and voltages may be calculated as follows. During normal operation, with Q2 saturated, resistors R1, R2 and R4 form a potential divider. Accordingly, the actual voltage stored on grid kick capacitor CK equals the difference of the supply voltages at terminals 16 and 18 (250–23) multiplied by the potential divider ratio which equals 430K (220K+430K+3K). Neglecting diode voltage drops and the saturation voltage of Q2. This amounts to a net stored voltage on capacitor CK of about 149.5 Volts from a supply of 250 volts thus yielding a charging efficiency of about 60% of the available supply voltage.

As previously mentioned, the present invention resides in part in the discovery of the rather poor charging efficiency of the prior art circuit. This is of no particular consequence in the application of the prior art circuit just described because of the availability of a +250 volt source. However, it is herein recognized that in grid kick applications where the available voltage is somewhat lower (e.g., +200 volts), the performance of the prior art circuit may not be adequate to fully blank the kinescope beam due to the efficiency problem discussed above. For such an application, in which improved charging efficiency is desired, the circuit 20 of FIG. 1 may be modified, in accordance with the invention, as shown in FIG. 2.

Figure 2:
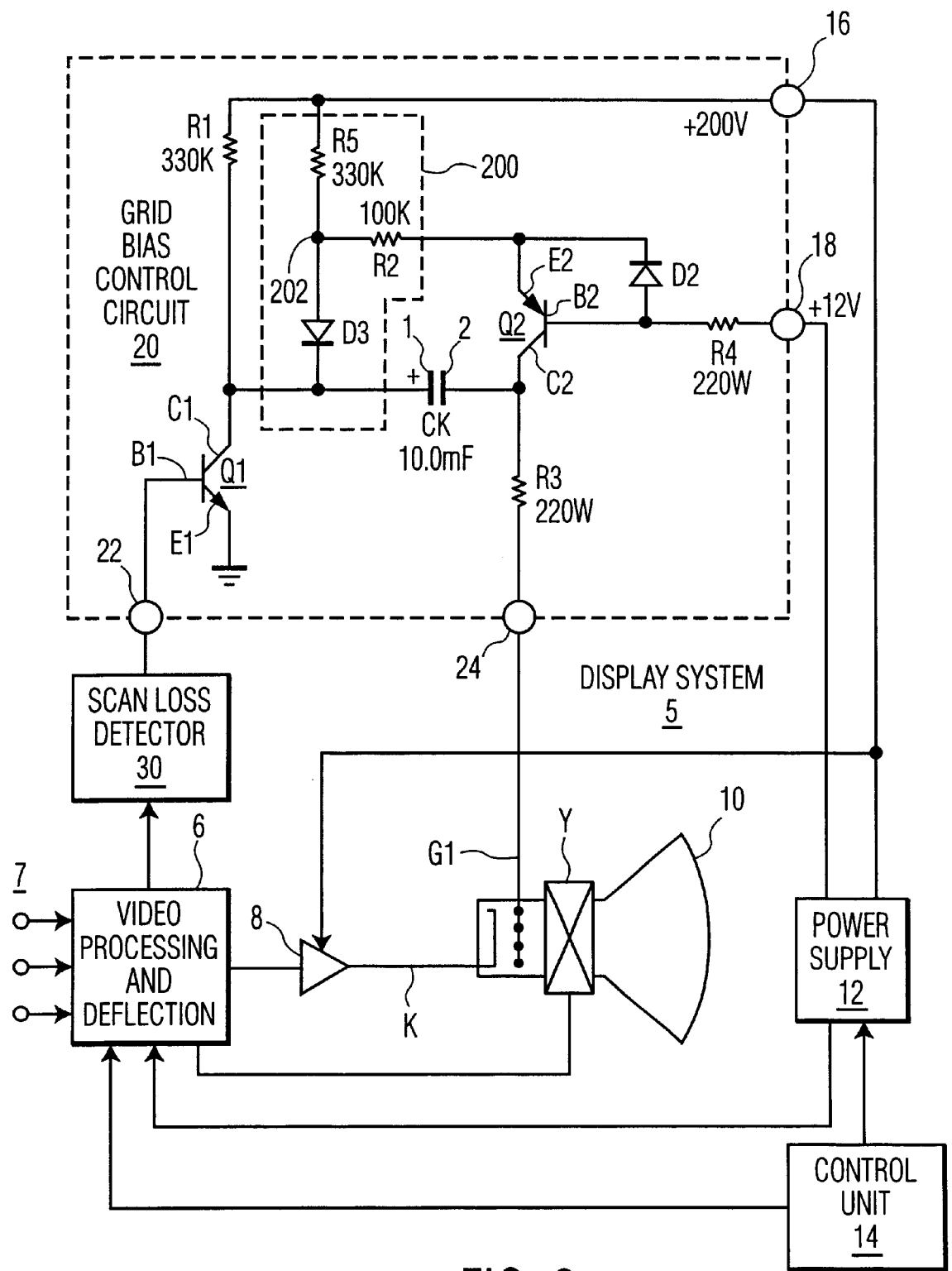
FIG. 2 is a circuit diagram, partially in block form, of a television apparatus having a grid bias control circuit according to the invention.

The principal modification in the grid bias control circuit of FIG. 2 comprises the addition of a network 200 for controlling common base amplifier transistor Q2. Also, the supply voltages have been reduced from +250 volts and +23 volts to +200 volts and +12 volts, respectively. Other changes will be discussed later. In network 200, the resistor R2 that was formerly connected to collector C1 of Q1 is connected instead directly via an added resistor R5 to the high voltage supply terminal 16 and a diode D3 is added with the anode thereof connected to the common connection 202 of resistors R2 and R5 and the cathode thereof connected to the collector C1 of transistor Q1. Another change is that the Vber protection diode D2, rather than being in series with R4 is instead connected across the base-emitter junction of Q2. Exemplary element values for the modified grid bias control circuit are: 330K Ohms for resistors R1 and R5, 100K Ohms for resistor R2, and 220 Ohms for resistors R3 and R4. Also, the capacitor CK value has been increased to 10 micro-Farads.

In operation, the network 200 controls the operation of the common base amplifier transistor Q2 by enabling the transistor (i.e., biasing Q2 on) with current supplied through a circuit path, including series connected resistors R2 and R5 connected, from the high voltage source 16, which enabling current is completely independent of the charging current flowing through the circuit path provided resistor R1. Accordingly, all of the charging current through resistor R1 is effective for charging the grid kick capacitor CK and so the charging efficiency is very high. Specifically, again neglecting diode drops, the capacitor is charged to a voltage equal to a difference of the supply voltages which is 188 Volts. The efficiency is thus 188/200 or about 94%, which is substantially greater than the approximate 60% charge efficiency previously discussed.

Improvement of the charging efficiency still leaves a problem, however with regard to control of the transistor Q2. This problem is solved by the added diode D3 which diverts all of the emitter current of amplifier Q2 to ground when transistor Q1 is turned on thereby turning transistor Q2 off during grid kick conditions. Accordingly, capacitor CK is charged to a relatively high voltage through the circuit path including resistor R1 and concurrently transistor Q2 is turned on by the independent current flowing through the circuit path including resistors R2 and R5 when the control signal provided by scan loss detector 30 indicates beam cut-off is not desired and transistor Q1 is off. When the control signal indicates beam cut-off is desired, transistor Q1 is caused to be turned on, in turn causing diode D3 to be turned on thereby diverting current flow from emitter E2 of transistor Q2 through resistor R2 and diode D3. As a result, transistor Q2 is turned off and the relatively high negative voltage developed at the second (2) electrode of capacitor CK during the charging operation is applied to grid G1. It will be noted that resistor R2 provides an important function in the overall operation of network 200. Specifically, this resistor prevents short circuiting the low voltage supply (+12 volts) when transistor Q1 is turned on. Without resistor R2, only the relatively low valued base resistor R4 of 220 Ohms would be available for limiting the current flow through diodes D2 and D3 and the transistor Q2 when Q2 is turned on.

It will be apparent to those skilled in the art that although the present invention has been described in terms of an exemplary embodiment, modifications and changes may be made to the disclosed embodiment without departing from the essence of the invention. It is to be understood that the present invention may be used in any video display apparatus which directs energy to a display screen to provide illumination on the display screen, including, but not limited to direct-view and projection display television receivers and computer and other monitors. It to be understood that while the arrangements shown in FIGS. 1 and 2, show kinescopes with single cathodes as may be employed in projection display systems, the invention clearly applicable in arrangements with kinescopes with multiple (e.g. three) cathodes associated with respective color channels. Therefore, it is to be understood that the present invention is intended to cover all modifications as would fall within the true scope and spirit of the present invention.

What is claimed is:

1. Apparatus for applying beam cut-off bias to the grid of a kinescope, comprising:

a capacitor having first and second electrodes;

a source for providing a beam cut-off control signal;

a first switching circuit responsive to a first condition of said control signal for allowing a first, charging current to be supplied to said first electrode of said capacitor from a first voltage source when beam cut-off is not desired, and responsive to a second condition of said control signal for coupling said first electrode of said capacitor to a source of reference potential when beam cut-off is desired;

a second switching circuit having a first electrode coupled to a second voltage source, a second electrode coupled to said second electrode of said capacitor and to said grid of said kinescope for coupling a second voltage source to said second electrode when enabled and isolating said second electrode from said second voltage source when disabled, and a third electrode; and a third switching circuit for allowing a second current that is independent of said first current to flow through a second circuit path to said second switching circuit to enable said second switching circuit when beam cut-off is not desired and for disabling said second switching circuit when beam cut-off is desired, said second circuit path including first and second resistors connected in series between said source of said first voltage source and said third electrode of said second switching circuit, said third switching circuit being coupled between said first switching circuit and a connection point between said first and second resistors.

2. Apparatus as recited in claim 1, wherein;

said first current is supplied through a first circuit path coupled between said first switching circuit and said first voltage source.

3. Apparatus as recited in claim 1, wherein:

said third switching circuit comprises a threshold conduction device.

4. Apparatus as recited in claim 1, wherein:

said second switching circuit comprises a common base amplifier having a base electrode corresponding to said first electrode, a collector electrode corresponding to said second electrode, and an emitter electrode corresponding to said third electrode.

5. Apparatus as recited in claim 1, wherein:

said first switching circuit comprises a common emitter amplifier having a base electrode coupled to said source of beam cut-off control signal, having a collector electrode coupled to said first circuit path and to said first electrode of said capacitor, and having an emitter electrode coupled to said source of reference potential.

6. Apparatus as recited in claim 5, wherein:

said first circuit path comprises a third resistor.

7. Apparatus for applying beam cut-off bias to the grid of a kinescope, comprising:

a capacitor having first and second electrodes;

a source for providing a beam cut-off control signal;

a first transistor arranged in a common emitter amplifier configuration having a base electrode coupled to said source of beam cut-off control signal, having a collector electrode coupled to a first voltage source via a first resistor and to said first electrode of said capacitor, and having an emitter electrode coupled to a source of reference potential;

a second transistor arranged in a common base amplifier configuration having a base electrode coupled to a second voltage source, having a collector electrode coupled to said second electrode of said capacitor and to said grid, and having an emitter electrode coupled to said first voltage source via second and third resistors connected in series; and a threshold conduction device coupled between said collector electrode of said first transistor and a connection point between said second and third resistors.

* * * * *